(12) United States Patent
Kim

(10) Patent No.: US 6,542,756 B1
(45) Date of Patent: Apr. 1, 2003

(54) METHOD FOR DETECTING FORWARD LINK POWER CONTROL BITS IN A COMMUNICATION SYSTEM

(75) Inventor: Jaehyeong Kim, Pine Brook, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,023

(22) Filed: Feb. 29, 2000

(51) Int. Cl.$^7$ .............................. H04B 7/00; H04Q 7/20
(52) U.S. Cl. ................. 455/522; 455/67.1; 455/67.3; 455/69; 455/115; 370/335; 370/342
(58) Field of Search ........................... 455/522, 13.4, 455/67.1, 67.3, 69, 115; 370/335, 342, 318; 375/133, 140, 141

(56) References Cited

U.S. PATENT DOCUMENTS

| | | |
|---|---|---|
| 5,544,156 A | 8/1996 | Teder et al. |
| 5,577,022 A | 11/1996 | Padovani et al. |
| 5,603,096 A | 2/1997 | Gilhousen et al. |
| 5,629,934 A | 5/1997 | Ghosh et al. |
| 5,722,061 A | 2/1998 | Hutchison, IV et al. |
| 5,751,763 A * | 5/1998 | Bruckert ............... 375/141 |
| 5,781,543 A | 7/1998 | Ault et al. |
| 5,790,537 A | 8/1998 | Yoon et al. |
| 5,799,011 A | 8/1998 | LaRosa et al. |
| 5,812,938 A | 9/1998 | Gilhousen et al. |
| 5,896,411 A | 4/1999 | Ali et al. |
| 5,933,781 A | 8/1999 | Willenegger et al. |
| 5,940,430 A | 8/1999 | Love et al. |
| 5,987,076 A | 11/1999 | Zehavi et al. |
| 5,991,284 A | 11/1999 | Willenegger et al. |
| 5,991,329 A | 11/1999 | Lomp et al. |
| 5,991,636 A | 11/1999 | Won et al. |
| 6,208,873 B1 * | 3/2001 | Black et al. ............... 455/522 |
| 6,304,563 B1 * | 10/2001 | Blessent et al. ............ 370/335 |

\* cited by examiner

*Primary Examiner*—Edward F. Urban
*Assistant Examiner*—Temica M. Davis
(74) *Attorney, Agent, or Firm*—Dilworth & Barrese

(57) ABSTRACT

A method is disclosed for deriving an optimum decision criteria to detect forward link power control bits by a base station from a reverse link signal. In managing the forward link received power, a mobile station commands the base station to incrementally alter the forward link transmit power, by sending periodic power control bits to the base station on a reverse link signal. The transmitted power control bits may be distorted by channel imperfections and multipath effects. The method disclosed derives an optimum decision variable for performing power control bit estimation at the base station. In a preferred embodiment, the optimum decision variable is computed by considering the in-phase and quadrature components of a single power control group received on the reverse pilot channel. Both the in-phase and quadrature components of the power control are respectively made up of a pilot part containing the reverse pilot signal which is repeated over a first fixed chip duration, and a power control part containing the forward power control bit, which is repeated over a second fixed chip duration. The optimum decision variable is obtained by first summing the respective in-phase and quadrature pilot parts over their respective first chip durations, summing the respective in-phase and quadrature power control parts over their respective in-phase and quadrature components, the respective multiplication results are then summed to yield a single result.

18 Claims, 5 Drawing Sheets

METHOD FOR DETECTING FORWARD LINK POWER CONTROL BITS IN A COMMUNICATION SYSTEM

BACKGROUND OF THE INVENTION

1. Field of the Invention

The invention relates generally to wireless communication systems and, more particularly, to a method for detecting forward link power control bits in a code division multiple access (CDMA) communication system.

2. Description of the Related Art

The IS-95 CDMA system is unique in that its forward and reverse links have different link structures. The forward link is made up of four types of logical channels: pilot, sync, paging, and traffic channels. The pilot channel is transmitted continuously by the base station to provide the mobile station with timing and phase reference. The reverse link is made up of two types of logical channels: access and traffic channels. The reason that a pilot channel is not used on the reverse link is that it has been heretofore impractical for each mobile station to broadcast its own pilot sequence. For this reason, a reverse pilot channel has not been suggested in IS-95.

The recently announced CDMA 2000 system, as defined by the Electronic Industry Association/Telecommunications Industry Association Interim Standard 95 (TIA/EIA/IS-95), includes a continuous Reverse Pilot Channel (R-PICH) and a Reverse Fundamental Channel (R-FCH), one or more Reverse Supplemental Channels (R-SCH), and a Reverse Dedicated Control Channel (R-DCCH). The Reverse Pilot Channel (R-PICH) is made up of a fixed reference value and multiplexed forward Power-Control (PC) information. The base station processes the Reverse Pilot Channel (R-PICH) to determine whether a +1 or a −1 was sent at each 1.25 ms power-control group (PCG). Decoding each power control group presents a challenge, however, in that channel imperfections and multipath effects can result in a receiver mistakenly detecting the received power control bit which may negatively impact system operation by causing forward link channels to transmit at inappropriate power levels. Thus, there is a resulting need for a method to better estimate the value of a power control bit at a receiver to better control forward link power levels.

SUMMARY OF THE INVENTION

The present invention provides a novel and improved method for detecting forward link power control bits by a base station from a reverse link signal. In one embodiment, the base station establishes communications on both the forward and reverse link with an SU. Communications are transmitted to the SU on the forward link and communications are received from the SU on the reverse link.

In managing the forward link received power, the SU commands the base station to incrementally alter the forward link transmit power. The SU performs such a task by sending periodic power control bits to the base station on a reverse link signal. The transmitted power control bits may be distorted by channel imperfections and multipath effects. The present invention derives an optimum decision variable for performing power control bit estimation at the base station. In the preferred embodiment, the optimum decision variable for determining the sign of a received power control bit is computed by considering the in-phase and quadrature-phase components of a single power control group received on the reverse pilot channel. Both the in-phase and quadrature-phase components of the power control group are respectively made up of a pilot part containing the reverse pilot signal which is repeated over a 1152×N chip duration, where N is the spreading rate, and a power control part containing the forward power control bit, which is repeated over a 384×N chip duration. The optimum decision variable is obtained by first multiplying the pilot part (e.g., 1152×N) by the power control part (e.g., 384×N) for the respective in-phase and quadrature components to obtain an in-phase and quadrature result and summing the two intermediate results to obtain a final value, whose sign provides an estimation regarding whether a +1 or −1 power control bit was sent by the SU.

According to one aspect of the invention, the present invention performs the method described above to include the different multipath components by using a rake receiver and summing the individual results of each finger to derive a better overall estimate of the transmitted power control bit.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where:

FIG. 3b is a diagram of a single power control group of FIG. 3a;

DESCRIPTION OF A PREFERRED EMBODIMENTS

Figure 1:
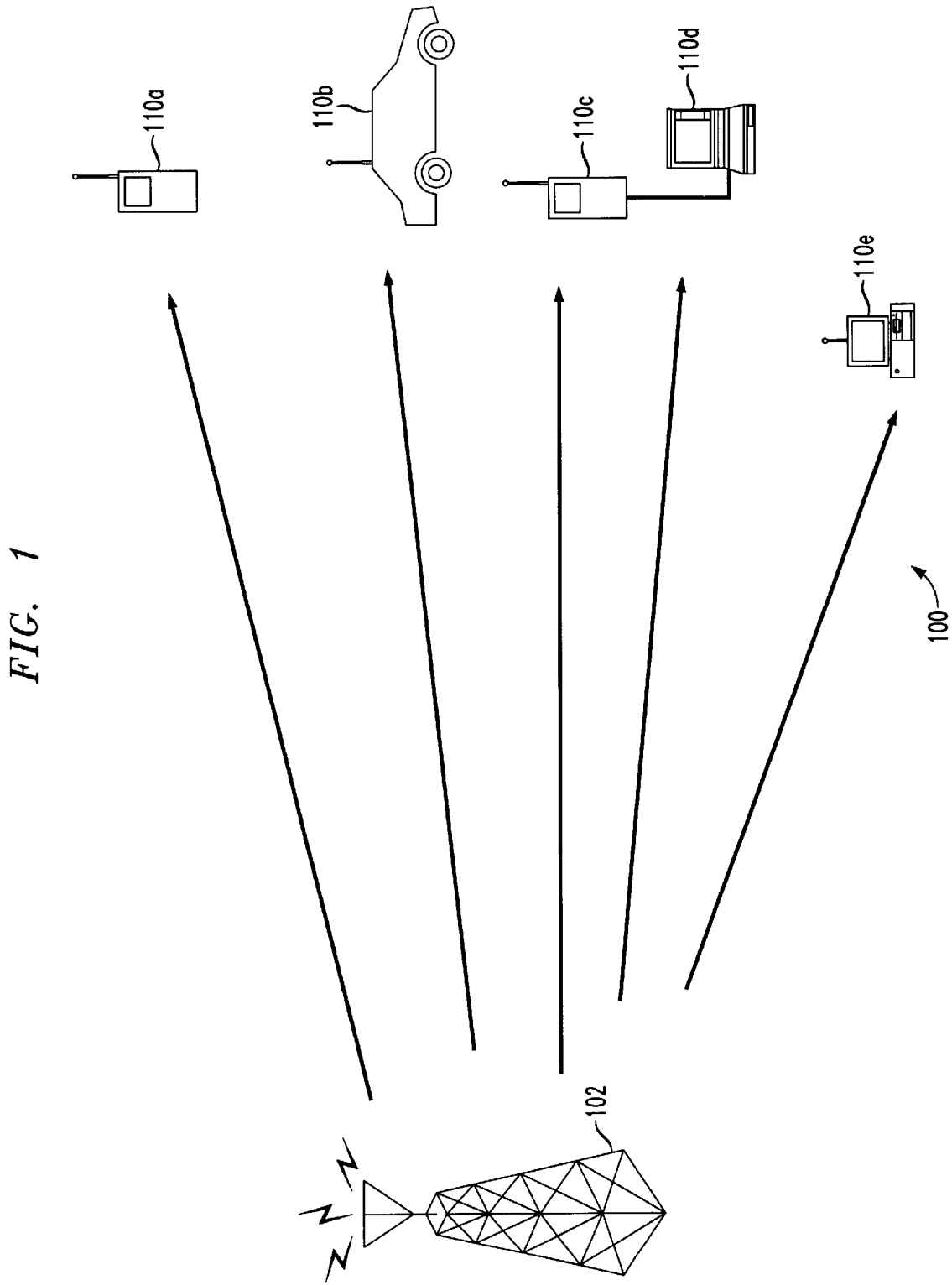
FIG. 1 is a diagram illustrating a wireless communication system implemented according to one embodiment of the present invention in which reverse link power control commands issued by mobile stations are received and implemented by a servicing base station.

FIG. 1 is a schematic diagram illustrating a wireless communication system, designated generally by reference numeral 100 and implemented according to the present invention in which forward link power control bits are detected at the base station 102. In the wireless communication system 100, the base station 102 operates according to the code division multiple access (CDMA) protocol as per ANSI 2000 standard. Thus, a plurality of subscribing units (SUs) 110a–110d operating within the service area, communicate with the base station 102 according to the CDMA protocol. However, it is also contemplated that in other embodiments, the base station 102 and the SUs may operate according to various other communication protocols. In still further embodiments, the base station 102 and the SUs 110a–110d may operate according to multiple communication protocols.

The TIA/EIA/IS-95 standard of performing power control in a CDMA communication system generally divides power control into two general categories: forward power control and reverse power control. There are three components of reverse power control: open loop, closed loop and outer loop. Open loop power control sets the transmit power based upon the power that is received at the mobile station. Open loop power control compensates for the path loss from the mobile station to the base station and handles very slow fading. Closed loop power control includes an 800 bps feedback loop from the base station to the mobile station to set the transmit power of the mobile station. Closed loop power control compensates for medium to fast fading and for inaccuracies in open loop power control. Outer loop power control is implementation specific but typically adjusts the closed loop power control threshold in the base station in order to maintain a desired frame error rate.

In addition to the forward and reverse power control methods described by the TIA/EIA/IS-95 standard, the later standard, i.e., TIA/EIA/IS-2000, provides for an additional form of forward power control where power control information is multiplexed on the reverse pilot channel (R-PICH). The time multiplexed forward power control information is referred to as the power control sub-channel; the details of which are described below with reference to FIG. 2.

Figure 2:
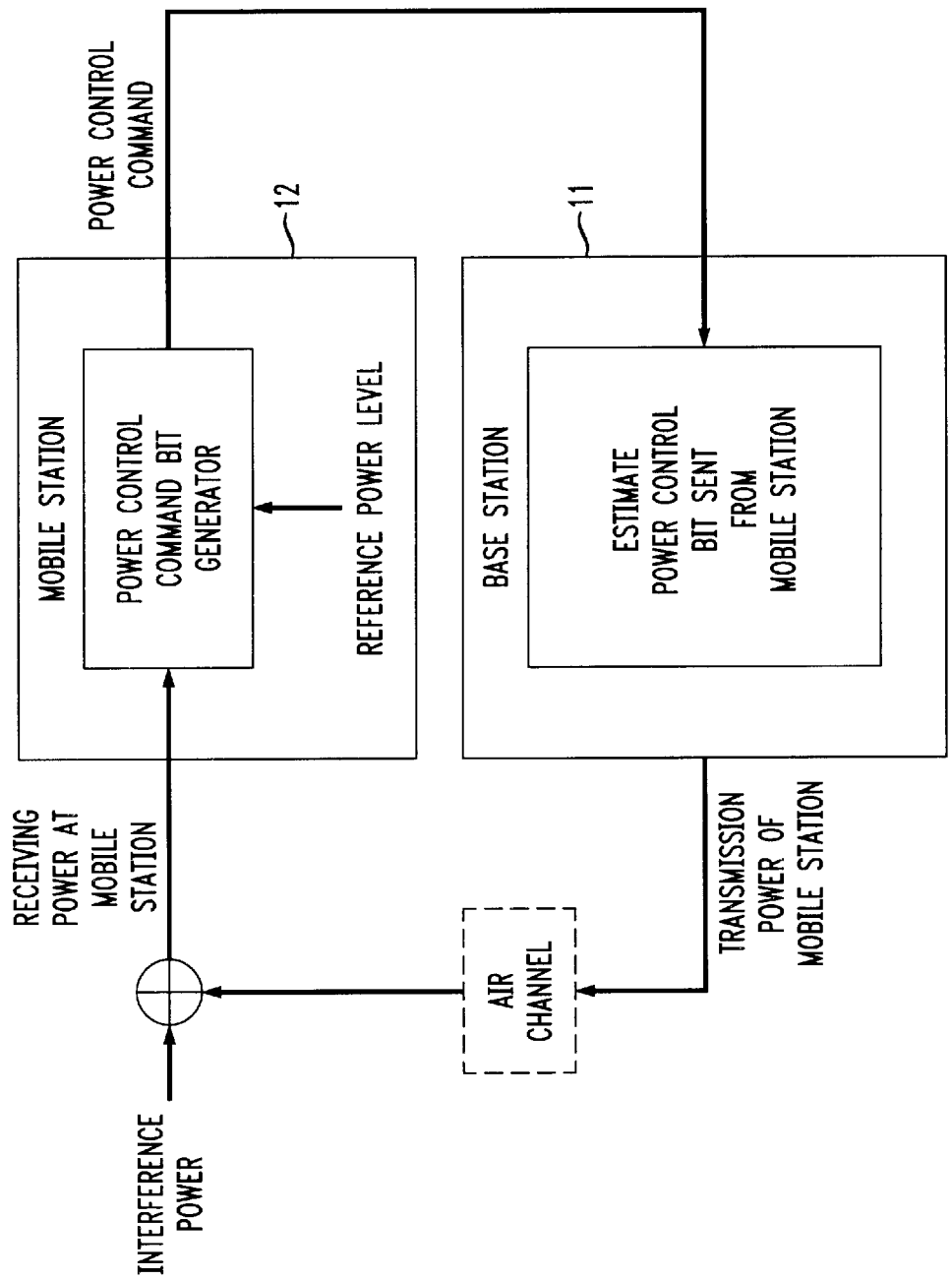
FIG. 2 is a block diagram of a reverse power control.loop used in a CDMA 2000 system.

Referring now to FIG. 2, there is shown a block diagram of a forward power control loop used in TIA/EIA/2000. An SU receives a signal transmitted from a base station on a forward link, compares it with an internally generated reference value, and generates forward-link power control bits to be carried on an R-PICH as reverse power sub-channel. In particular, forward link power control bits are time-multiplexed in the last quarter of each 20 ms frame of the reverse pilot channel.

Figure 3A:
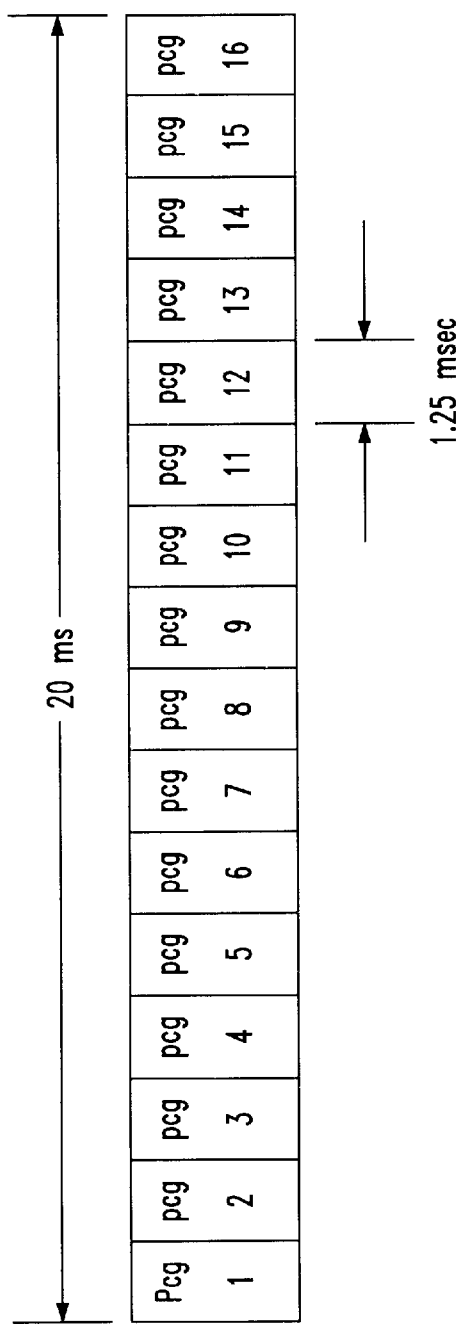
FIG. 3a is a diagram illustrating a single frame of a reverse pilot channel according to the present invention comprising 16 power control groups.

FIG. 3a illustrates a 20 ms frame structure for a reverse pilot channel divided into 16 segments, where each individual segment is known in the art as a power control group having a duration of 1.25 msec (20 ms/16 segments).

Figure 3B:
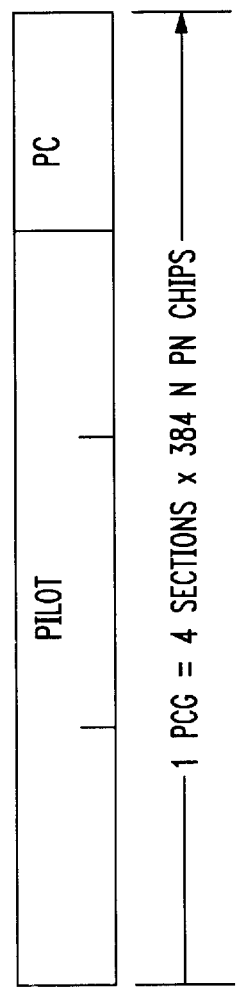

FIG. 3b illustrates a single power control group of FIG. 1. The power control group is shown divided into four sections of equal length. In accordance with the CDMA 2000 system, the first three quarters of the power control group contain a repeated sequence of pilot symbols having a fixed value equal to the value of the PN code of the reverse link. The last quarter contains a repeated sequence of power control symbols having a fixed value equal to the value of the power control bit (PCB) transmitted in that particular transmission interval. It is further noted that the pilot symbols and the power-control symbols which make up the power control group are all sent with the same power level.

The reverse power sub-channel provides information on the quality of the forward link at the rate of 1 bit per Power Control Group, (1 bit/1.25 ms), and is used by the forward link channels to adjust their power. The amount of mobile power increase and power decrease per each PCB is nominally +1 dB and −1 dB, respectively, however the TIA/EIA/IS-2000 standard provides for 0.5 dB and 0.25 dB respective increments.

In accordance with the TIA/EIA/IS-2000 standard, each 1.25 ms power control group on the reverse pilot channel contains 384×4×N PN chips, where N is the spreading rate number (e.g., N=1 for Spreading Rate 1 and N=3 for Spreading Rate 3). The present embodiment describes the method of the present invention for a reverse pilot channel having a spreading rate of 3. It is contemplated by the present invention that spreading rates other than 3 may be used. In a preferred embodiment, for a spreading rate of 3, a single power control group would include 4608 chips (384×4 groups×spreading rate of 3).

FIG. 3b illustrates a single power control group having a spreading rate of 3, including 4608 chips divided into 4 sections of 1152 chips, where the 1152 chips in each of the first three sections transmit the pilot signal (+1), and the 1152 chips in the final section (i.e., last quarter) transmit the reverse power sub-channel information. The reverse power sub-channel information transmitted in the last quarter of the frame is transmitted as 1152 chips, where each chip has a constant value over the 1152 chip duration of either +1 or −1, where a +1 value corresponds to a power control bit of "0" and thus an increase in power, and a −1 value corresponds to a power control bit of "1" and thus a decrease in power.

Figure 4A:
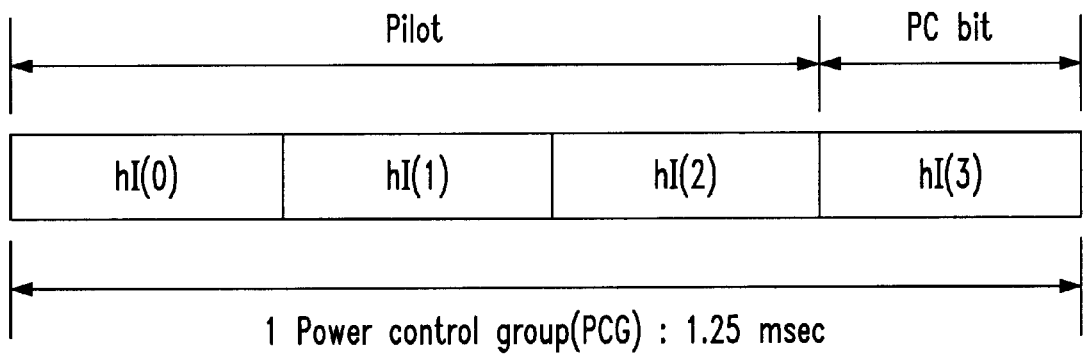
FIG. 4a is a diagram of the in-phase component of a single power control group after being received over a fading channel after complex despreading.
Figure 4B:
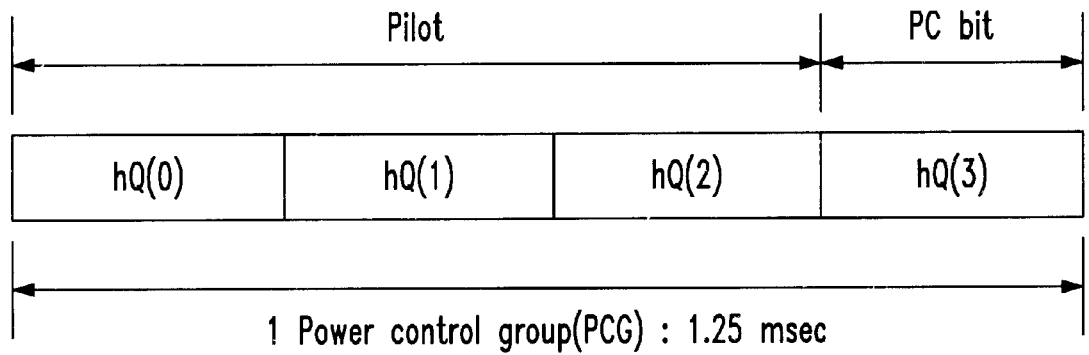
FIG. 4b is a diagram of the quadrature-phase component of a single power control group after being received over a fading channel after complex despreading.

FIGS. 4a and 4b illustrate a single power control group of the complex reverse pilot signal (R-PICH) after being multiplied by respective I and Q PN sequences at the receiver. The complex reverse pilot signal is used by the mobile station for initial acquisition, time tracking, Rake-receiver coherent reference recovery and power-control measurements. It is a complex channel having in-phase (I) and quadrature (Q) components. FIGS. 4a and 4b illustrate the respective I and Q components of the complex reverse pilot signal, where hI(0) represents the accumulation of the first 1152 chips (i.e., first section) of the power control, and hI(1) represents the accumulation of the next 1152 chips (i.e., second section) of the power control group. Accordingly, hI(2) and hI(3) represent the respective accumulation of the third and fourth sections of the power control group. FIG. 4b illustrates a similar result for the quadrature channel component of the power control group;

In order to derive an estimate of the power control bit, the respective probability density functions of hI(3) and hQ(3) are determined, where hI(3) and hQ(3) are random variables. In general, obtaining the probability density function for random variables is not possible, however, in a special case, if the mean and variance of the gaussian random variables can be determined, the probability density function is attainable. It must therefore be shown that the random variables hI(3) and hQ(3) are gaussian random variables.

Derivation of hI(3) and hQ(3) as Gaussian Random Variables

The mean and variance of hI(3) and hQ(3) are derived below. The following definitions are provided to assist in the understanding of their derivation. Further, the derivation assumes that $\rho$ and $\theta$ are constant over a power control group. It is further assumed that timing recovery is within a pre-specified tolerance.

M: coherent integration length of a quarter power control group that is 1.25 msec, which is 1152 chips (the time duration of a chip is defined as Tc=0.27127 μsec).

$\rho$: fading envelope, assumed to be constant over a power control group $\theta$: the combined effect of Doppler frequent shift and frequency offsets, assumed to be constant over a power control group.

(PNI, PNQ): complex PN sequence.

(nI, nQ): complex channel noise plus quantization noise after the automatic gain control block.

A: pilot signal amplitude.

i: discrete time index in the unit of chip.

r(i): 4 bits complex signal after automatic gain control.

When the forward-link power control bit is +1, the pilot signal p(i) transmitted at the mobile station is $$p(i) = A(PNI(i) + jPNQ(i)) \quad (1)$$

otherwise; if the forward-link power control bit is −1:

$$\underline{p}(i) = A(PNI(i) + jPNQ(i)), \quad 0 \le i < \frac{3}{4}PCG \quad (2)$$
$$= -A(PNI(i) + jPNQ(i)), \quad \frac{3}{4}PCG \le i < PCG$$

As illustrated in equations (1) and (2), the phase of the pilot signal is rotated by 180° at the power control bit location. After the fading channel and automatic gain control (AGC), the received pilot signal r(i) is defined as $$r(i) = A\rho e^{j\theta}(PNI(i) + jPNQ(i)) + nI(i) + jnQ(i) \quad (3)$$

Input signal power is $2A^2 \rho^2$ and noise power is $E[nI^2] + E[nQ^2]$, where $E[.]$ represent the expected value. The input pilot signal to noise ratio is defined as $$Input\ SNR = \frac{2A^2 \rho^2}{E[nI^2] + E[nI^2]} \quad (4)$$

Since the signal received at the base station is made up of signals from a plurality of mobile stations, the received signal can be assumed to have Gaussian statistics by applying the principles of the Central Limit Theorem which is well known in the art. Considering that the noise power is a lot larger than the signal power of the received signal, the statistics of the received signal are assumed to be that of the noise. Further, because the I-channel and Q-channel are mutually orthogonal communication media, it can be assumed that the I-channel noise and Q-channel noise are iid (independent and identically distributed) gaussian random variables with zero means. Then $\sigma^2$ is defined as the variance of nI and nQ. At a normal operating point, the input SNR is −30 dB. Considering that the variance of the I-channel and Q-channel AGC outputs are constant (defined as $C_{AGC}$) and that the noise power is much larger than the signal power, $\sigma^2$ is derived in equation (5) as $E[|r(i)|^2] = E$

[Inphase AGC output]$^2 + E$

[Quadraturephase AGC output]$^2 \approx 2$ $C_{AGC} = 2A^2 \rho^2 + E[nI$ $(i)^2] + E[nQ(i)^2]$ Low SNR → $\approx E[nI(i)^2] + E[nQ$ $(i)^2] = 2\sigma^2$ $\sigma^2 \approx C_{AGC} \quad (5)$ The signal h(l), where l=0,1,2,3 represents the accumulation of the respective $1^{st}$, $2^{nd}$, $3^{rd}$, and $4^{th}$ sections of the power control group, after complex despreading is:

$$\underline{h}(l) = \sum_{i=0}^{M-1} \underline{r}(i)(PNI(i) - jPNQ(i)) \quad (6)$$
$$= \sum_{i=0}^{M-1} 2A\rho e^{j\theta} + \sum_{i=0}^{M-1} [nI(i)PNI(i) + nQ(i)PNQ(i)] +$$
$$j \sum_{i=0}^{M-1} [nQ(i)PNI(i) - nI(i)PNQ(i)]$$
$$= 2MA\rho e^{j\theta} + \eta I + j\eta Q$$
$$= 2MA\rho \cos\theta + \eta I + j(2MA\rho \sin\theta + \eta Q)$$

Equation (6) illustrates the process of complex despreading whereby a complex received signal r(i) multiplied by an in-phase PN code, PNI(i) and a quadrature-phase PN code, respectively with the resulting product terms being summed over M, where M is the coherent integration length of a quarter power control group. When M is large, by the Central Limit Theorem, ηI and ηQ are Gaussian random variables. Because the in-phase and quadrature-phase noise components are uncorrelated, the expected value of their product is the same as the product of their expected values. Considering E[nI] and E[nQ] are zero, it therefore follows that E[nI(i)nQ(k)]=0, for all the integer i, k.

It is also true that samples of the in-phase noise component are uncorrelated for different sampling times (sampling period is a chip duration). Then, by the same reasoning as above, $E[nI(i)nI(k)] = 0$, if $i \ne k$ Considering PNI(i) and PNQ(i) can have +1 or −1 values and knowing the noise correlations, the variance of ηI is calculated as $$var[\eta I] = E\left[\sum_{i=0}^{M-1} [nI(i)PNI(i) + nQ(i)PNQ(i)] \right. \quad (7)$$
$$\left. \sum_{k=0}^{M-1} [nI(k)PNI(k) + nQ(k)PNQ(k)]\right]$$
$$= E\left[\sum_{i=0}^{M-1} nI(i)^2 + \sum_{i=0}^{M-1} nQ(i)^2\right]$$
$$= \sum_{i=0}^{M-1} E[nI(i)^2] + \sum_{i=0}^{M-1} E[nQ(i)^2] = 2M\sigma^2$$

ηI and ηQ are mutually independent random variables with the same statistics.

From the results of equation (6) and (7), hI(l) are Gaussian random variables with mean $2MA\rho \cos\theta$ and variance $2M\sigma^2$, and hQ(l) are Gaussian random variables with mean $2MA\rho \sin\sigma$ and variance $2M\sigma^2$.

Knowing that hI(l) and hQ(l) are Gaussian random variables with mean $2MA\rho \sin\theta$ and variance $2M\sigma^2$, the special case for determining the probability density function is satisfied. The probability density function is then used to derive an optimum decision criteria using maximum a posteriori estimation, as will be defined below.

Derivation of an Optimum Decision Criteria

Define the following two parameters, U and V as:

$U = hI(3)$ and $V = hQ(3) \quad (8)$

Where hI(3) and hQ(3) contain the power control information in each power control group (i.e., the accumulated 1152 chips in the fourth section of the power control group. Now derive a pair of random variables (X,Y) which are good estimates of (E[U], E[V]), where E[U]=2MAρ cos θ, and E[V]=2MAρ sin θ under given constraints. X and Y may be derived in a number of ways in alternate embodiments, however, in the preferred embodiment (X,Y) is derived as $$X=\frac{1}{3}[hI(0)+hI(1)+hI(2)] \text{ and } Y=\frac{1}{3}[hQ(0)+hQ(1)+hQ(2)] \qquad (9)$$

It can therefore be shown that the variance of (X,Y) is equal to $2M\sigma^2/3$, which is a third of the variance of (U,V). Accordingly, the smaller variance leads to a more reliable estimate of the power control bit. X and Y, as defined in equation, represent the sum or accumulation of the first three sections of the respective I and Q components of the power control group, namely, the sum of 1152 chips×3=3456.

Figure 5:
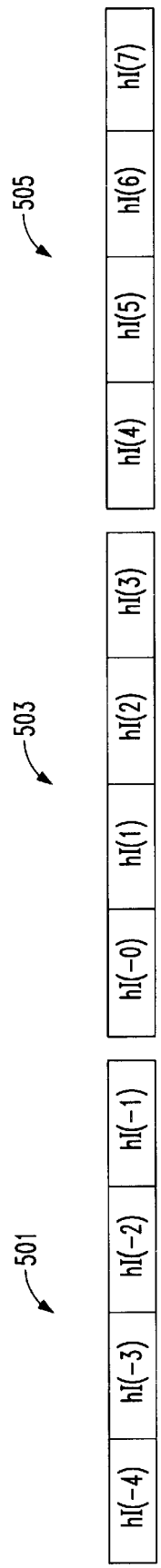
FIG. 5 is a diagram of three power control groups received in consecutive order.

The present invention contemplates a number of alternatives for computing X and Y other than Equation (9) above. For example, an additional power control group may be considered for power control bit estimation. FIG. 5 illustrates three consecutively transmitted power control groups transmitted from the mobile station, where the Power Control Group, generally designated as 503 is considered the power control group currently being received by the base station. A better estimate of X and Y may be obtained by considering the subsequently received power control group 505 in combination with the current power control group 503 to form a better estimate of X and Y. It should be noted that the better estimate comes at the additional cost of estimation delay. That is, an optimum decision cannot be made until both power control groups 503 and 505 are processed, as defined by equation (10). Equation (10) illustrates that by using the first ¾ of power control group 505 in combination with power control group 503, a better estimate of X and Y may be obtained.

$$X = \frac{1}{6}(hI(0) + hI(1) + hI(2) + hI(4) + hI(5) + hI(6)) \qquad (10)$$

$$Y = \frac{1}{6}(hQ(0) + hQ(1) + hQ(2) + hQ(4) + hQ(5) + hQ(6))$$

In a further embodiment, when a mobile station is moving very slowly such that ρ and θ can be considered as constant over more than two power control groups, X and Y can be better estimated by considering the previous power control group 501 in combination with power control group 503, defined as:

$$X = \frac{1}{6}(hI(-4) + hI(-3) + hI(-2) + hI(0) + hI(1) + hI(2)) \qquad (11)$$

$$Y = \frac{1}{6}(hQ(-4) + hQ(-3) + hQ(-2) + hQ(0) + hQ(1) + hQ(2))$$

It should be noted that equation (11) is not subject to the estimation delay drawback defined by equation (10), as a consequence of using a previously received power control group 501.

Applying maximum a posteriori estimation. Let (x,y) and (u,v) be observed vectors of random vectors (X,Y) and (U,Y), respectively. Each of the variables are defined as vectors to satisfy the general case of a Rake receiver having K fingers where a separate result is obtained for each finger. Define events T1 and T2 as $$T1(x \leq X \leq x+dx, \; y \leq Y \leq y+dy)$$

$$T2(u \leq U \leq u+du, \; v \leq V \leq v+dv) \qquad (12)$$

where x, y, u, and v are observed events, defined as:

x is the observed result from accumulating the first 3456 chips of the I component of the power control group.

y is the observed result from accumulating the first 3456 chips for the Q component of the power control group.

u represents the accumulation of the last 1152 chips of the I component of the power control group, containing the power control information.

v represents the accumulation of the last 1152 chips of the Q component of the power control group, containing the power control information.

Then the derivation of the optimum decision criteria begins with equation (12), defined as:

$$P[PC \text{ bit}=+1|T1, T2] \text{ compare } P[PC \text{ bit}=-1|T1, T2] \qquad (13)$$

Equation (13) defines two conditional probabilities, where the first conditional probability is the probability of a power control bit being equal to +1 given the occurrence of events T1 and T2. The second conditional probability is the probability of a power control bit being equal to −1 given the occurrence of events T1 and T2.

Finding the probability density function from equation (13) is difficult, and therefore equation (13) will be manipulated to a form that yields more readily to finding the probability density function. Accordingly, consider that event Ti is independent of the PC bits (X and Y values are not influenced by PC bits), and assuming that P[PC bit=+1]=P[PC bit=−1]=0.5. Then equation (13) becomes $$\frac{P[PC \; bit = +1, T1, T2]}{P[T1, T2]} \text{ compare } \frac{P[PC \; bit = -1, T1, T2]}{P[T1, T2]} \qquad (14)$$

$$P[T2, T1, PC \; bit = +1] \text{ compare } P[T2, T1, PC \; bit = -1]$$

$$\frac{P[T2|T1, PC \; bit = +1]}{P[T1]P[PC \; bit = +1]} \text{ compare } \frac{P[T2|T1, PC \; bit = -1]}{P[T1]P[PC \; bit = -1]}$$

$$P[T2|T1, PC \; bit = +1] \text{ compare } P[T2|T1, PC \; bit = -1]$$

The first comparison of equation (14) states on the left-hand side that the conditional probability of receiving a PC bit value of +1 given events T1 and T2, and the right hand side states that the conditional probability of receiving a −1 value given events T1 and T2. However, the first comparison is not in a form that is amenable to determining the probability density functions. As such, the subsequent comparisons of equation (14) utilize the Bayesian rule to re-arrange equation (14) to a form which lends itself more readily to deriving the probability density functions. That is, the conditional probabilities P[T2|T1, PC bit=+1] and P[T2|T1, PC bit=−1] recited in the final comparison of equation (14) are in a form which is more amenable to determining the probability density function, as compared with the first comparison of equation (14), which is equivalent to equation (13).

To find an optimum decision criteria from equation (14), the probability density function of T2 must be derived. To derive the probability density function of T2, because T2 is a random variable, it must be shown that T2 is a gaussian random variable with known mean and variance. It is apparent that event T2 is equivalent to events (U,V), and given that (U,V) have been proven to be gaussian random variables with a known variance, it therefore follows that event T2 is a gaussian random variable. Further, it is assumed that the mean of T2 is equal to the observed value of T1 because T1 is more reliable event. T1 is more reliable than T2 as it represents the accumulation of three times the number of chips (e.g., 3456 chips) in a power control group, as compared with the number of chips in event T1 (e.g., 1152 chips). It is important to recognize that having a reliable estimate of T1 is critical to the present invention given the assumption that the mean of T2 is that of T1. Knowing the estimated mean of T2 (i.e., equal to the event T1) and the variance of T2 (i.e., equal to the variance of (U,V)), and that T2 is a 2K mutually independent jointly gaussian random variable, the probability density function of T2 is attainable, and is defined as:

$$P[T2 | T1, PC\ bit = +1] = \qquad (15)$$

$$\prod_{k=1}^{K} \frac{du_k dv_k}{2\pi\sigma_{Uk}\sigma_{Vk}} \exp\left\{-\frac{(u_k - x_k)^2}{2\sigma_{Uk}^2} - \frac{(v_k - y_k)^2}{2\sigma_{Vk}^2}\right\}$$

$$P[T2 | T1, PC\ bit = -1] =$$

$$\prod_{k=1}^{K} \frac{du_k dv_k}{2\pi\sigma_{Uk}\sigma_{Vk}} \exp\left\{-\frac{(u_k + x_k)^2}{2\sigma_{Uk}^2} - \frac{(v_k + y_k)^2}{2\sigma_{Vk}^2}\right\}$$

Where equation (15) represents the general case of a probability density function of 2K mutually independent jointly Gaussian random variables, where K represents the number of fingers in the receiver. That is, when there is more than one path, the information from the power control groups needs to be combined from all the paths. The logarithm is taken on both probability events resulting in equation (16):

$$\ln P[T2 | T1, PC\ bit = +1] = \qquad (16)$$

$$\sum_{k=1}^{K} \ln\left(\frac{du_k dv_k}{2\pi\sigma_{Uk}\sigma_{Vk}}\right) - \sum_{k=1}^{K} \left(\frac{(u_k - x_k)^2}{2\sigma_{Uk}^2} + \frac{(v_k - y_k)^2}{2\sigma_{Vk}^2}\right)$$

$$\ln P[T2 | T1, PC\ bit = -1] =$$

$$\sum_{k=1}^{K} \ln\left(\frac{du_k dv_k}{2\pi\sigma_{Uk}\sigma_{Vk}}\right) - \sum_{k=1}^{K} \left(\frac{(u_k + x_k)^2}{2\sigma_{Uk}^2} + \frac{(v_k + y_k)^2}{2\sigma_{Vk}^2}\right)$$

The optimum decision criteria for determining the sign of the power control bit is obtained by subtracting the second term from the first in equation (16), to yield the optimum decision criteria:

$$\xi = \ln P[T2 | T1, PC\ bit = +1] - \ln P[T2 | T1, PC\ bit = -1] \qquad (17)$$

$$= \sum_{k=1}^{K} \left(\frac{u_k x_k}{\sigma_{Uk}^2} + \frac{v_k y_k}{\sigma_{Vk}^2}\right)$$

The optimum decision criteria states that if the result, $\xi$, is larger than zero, the power control bit is +1, otherwise, the power control bit is −1. Assuming that the system in which the present method is utilized is using automatic gain control, the In-phase and Quadrature-phase component input to all the fingers have the same noise variances, namely, $2M\sigma^2$. As such, the scale factor is unnecessary and the optimized and simplified decision criteria is $$\xi = \sum_{k=1}^{K} (u_k x_k + v_k y_k) \qquad (18)$$

The optimum decision criteria of equation (18) for forward-link power control bit estimation, is given under the following assumptions. First, it is assumed that the automatic gain control of the receiver is working properly. Second, the fading envelope $\rho$ and phase $\theta$ are almost constant over a power control group (1.25 msec). The above two assumptions are true in most cases of CDMA 2000 system operation.

What is claimed is:

1. At a base station, a method for detecting forward link power control bits of a remote device which transmits a signal having an in-phase and a quadrature-phase component, wherein each of said in-phase and quadrature components are transmitted as a consecutive sequence of frames and wherein each frame includes a plurality of power control groups, each power control group including non-power control data and power control data, said method comprising the steps of:
   (a) receiving said signal;
   (b) summing said non-power control data from the in-phase component of at least one of said power control groups to obtain a first result;
   (c) summing said non-power control data from the quadrature-phase component of at least one of said power control groups to obtain a second result;
   (d) summing said power control data from the in-phase component of one of said power control groups to obtain a third result;
   (e) summing said power control data from the quadrature-phase component of one of said power control groups to obtain a fourth result;
   (f) multiplying said first result by said third result to obtain a first intermediate result;
   (g) multiplying said second result by fourth result to obtain a second intermediate result;
   (h) summing said first and second intermediate results to obtain a final result;
   (i) determining that a transmitted power control bit is positive when said final result is positive; and
   (j) determining that a transmitted power control bit is a negative when said final result is negative.

2. The method according to claim 1, wherein said non-power control data from the in-phase component is pilot channel data.

3. The method according to claim 1, wherein said non-power control data from the quadrature-phase component is pilot channel data.

4. The method according to claim 1, wherein said power control data from the in-phase component is a power control bit in a repeated sequence.

5. The method according to claim 1, wherein said power control data from the quadrature-phase component is a power control bit in a repeated sequence.

6. The method according to claim 1, wherein said in-phase component of each of said power control groups includes a first section, a second section, a third section, and a fourth section, wherein said first, second, and third sections contain pilot channel data, and said fourth section contains said power control data.

7. The method according to claim 6, wherein the summing step (b) sums said pilot channel data in said first, second, and third sections of one of said power control groups and a first, second, and third section of an adjoining power control group to yield said first result.

8. The method according to claim 6, wherein the summing step (b) sums said pilot channel data in said first, second, and third sections of one of said power control groups to obtain said first result.

9. The method according to claim 4, wherein the summing step (d) sums said power control data in said fourth section to obtain said third result.

10. The method according to claim 1, wherein said quadrature-phase component of one of said power control groups consist of a first section, a second section, a third section, and a fourth section, wherein said first, second, and third sections contain pilot channel data, and said fourth section contains power control data.

11. The method according to claim 10, wherein the summing step (c) sums said pilot channel data in said first, second, and third sections.

12. The method according to claim 10, wherein the summing step (c) sums said pilot channel data in said first, second, and third sections and a first, second, and third section of an adjoining power control group to yield said second result.

13. The method according to claim 10, wherein the summing step (e) sums said power control data in said fourth section to obtain said fourth result.

14. The method according to claim 1, wherein said signal is received by at least two fingers of a Rake receiver at said base station.

15. The method according to claim 14, wherein at least one final result is obtained at each of at least two fingers of said Rake receiver, and a combined final result is obtained by summing said at least one final result obtained at each of said at least two fingers.

16. At a base station, a method for detecting forward link power control bits of a remote device which transmits a signal having an in-phase and a quadrature-phase component, wherein each of said in-phase and quadrature components are transmitted as a consecutive sequence of frames and wherein each frame includes a plurality of power control groups, each power control group including non-power control data and power control data, said method comprising the steps of:

(a) receiving said signal;

(b) summing said non-power control data for each of the in-phase and quadrature-phase components of at least one of said power control groups;

(c) summing said power control data for each of the in-phase and quadrature-phase components of one of said power control groups;

(d) multiplying said summed non-power control data with said summed power control data for each of the in-phase and quadrature components of one of said power control groups to form an in-phase result and a quadrature-phase result;

(e) summing the in-phase result with the quadrature-phase result to form a final result; and (f) determining that a transmitted power control bit is positive when said final result is positive; and otherwise determining that a transmitted power control bit is negative when said final result is negative.

17. The method according to claim 16, wherein said in-phase and quadrature-phase non-power control data is pilot channel data.

18. The method according to claim 16, wherein said in-phase and quadrature-phase power control data is a power control bit in a repeated sequence.

* * * * *